JEAN LEON REUTTER
INVENTOR

BY Haseltine, Lake & Co.
ATTORNEYS

May 10, 1938. J. L. REUTTER 2,117,211
THERMAL MOTOR FOR REWINDING CLOCKS OR LIKE APPARATUS
Filed Sept. 26, 1934 2 Sheets-Sheet 2

INVENTOR:
JEAN LÈON REUTTER
BY Haseltine Lake & Co.
ATTORNEYS

Patented May 10, 1938

2,117,211

UNITED STATES PATENT OFFICE 2,117,211

THERMAL MOTOR FOR REWINDING CLOCKS OR LIKE APPARATUS

Jean Léon Reutter, Paris, France

Application September 26, 1934, Serial No. 745,564
In Switzerland October 10, 1933

14 Claims. (Cl. 185—11)

My invention has for its object a thermical motor which may be especially used for automatically rewinding clocks or like devices, by means of the variations of temperature of the air.

Devices have already been proposed for rewinding clock mechanisms or the like, which use the variation of pressure or of temperature of the surrounding air, or of both simultaneously.

The motor according to my invention has an advantage with regard to means known hitherto, in that it allows the use of fluids under very high pressure, thus increasing to a great extent the production of mechanical energy. The main feature of the invention consists in that, to produce a mechanical energy, I use the differences of the variations of pressure of two different fluids, the temperature of which varies simultaneously.

These two liquids may consist: either in a gas (or a gaseous mixture) at a temperature higher than its critical temperature on the one hand and a saturated vapor on the other hand; or in a gas (or a gaseous mixture) at a temperature higher than its critical point and a mixture of saturated vapors; or in a saturated vapor and a mixture of saturated vapors; or in two different mixtures of saturated vapors, differentiating by the kind of chemical composition or merely by the proportions; or in two gases or saturated vapors issuing from certain chemical dissociations varying with the temperature (for instance, the ammoniacal silver chlorides).

Another object of the invention consists in means so designed that the differences of pressure obtained when the temperature of the two fluids varies simultaneously, are caused to be transformed into a useful mechanical energy.

As an example, the motor according to the invention may be constituted by a rigid or indeformable container or receptacle which contains one of the two fluids and within which another container is mounted. The last named container is resilient and deformable and contains the other fluid. The mechanical deformations of the second container (deformations due to the difference of the variations of pressure of said fluids) are suitably transmitted for rewinding clock mechanisms or the like.

According to a further object of this invention,—and this is especially provided to prevent the lack of tightness in the transmission to the outside of the deformations of the resilient container—the motor comprises means to transform the reciprocating linear movement of said resilient container or receptacle, into a rotary movement around the axis of the rigid container, of an eccentrically mounted mass inside said rigid container or receptacle. The said axis may be horizontal and the rotary displacements of said mass makes a certain couple of forces, the reaction of which is applied on the outer container and causes the latter to be rotated on its axis.

The means for transforming the reciprocating linear movement of the inner resilient receptacle into a rotating movement of the mass, may comprise a screw having a long thread, coaxially disposed with said resilient receptacle and connected thereto, said screw cooperating with a suitable nut fixed to the mass. Or the transforming device may comprise a pulley and wire mechanism or a rack and toothed wheel mechanism. If necessary to obtain a rotation of the screw or of the pulley, always in the same direction, ratchet wheels and pawls may be used.

The attached drawings illustrate a number of examples of realization of the invention.

Figure 1:
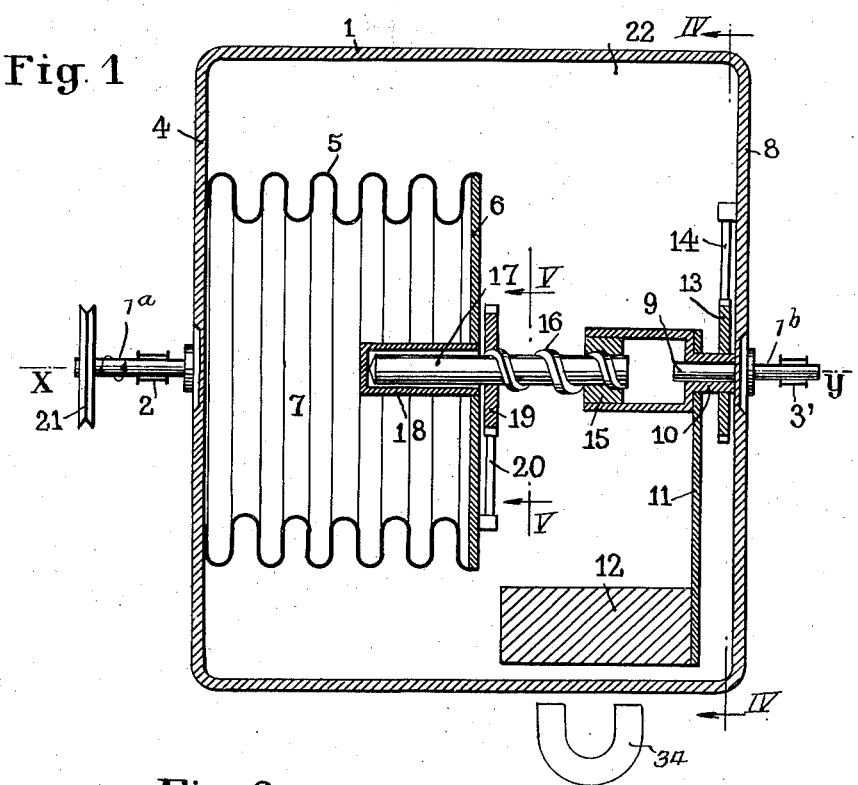
Fig. 1 shows one embodiment of the device according to the invention.

As shown in Fig. 1, the motor comprises a cylindrical body 1, absolutely tight and rigid, the axis of which is shown at $x$—$y$. This body 1 is rotatably mounted around its axis by means of two shafts 1$^a$ and 1$^b$ respectively arranged at each end of the said body and fast thereto and the bearings are diagrammatically shown at 2 and 3. To the inner face of the end 4 of the cylinder 1, a resilient bellows 5 is secured, which is also absolutely airtight and the free end of which may be freely displaced parallelly to the axis $x$—$y$.

The space 7 comprised within the bellows 5 is filled with a saturated vapor for instance, while the space 22 comprised between the bellows 5 and the cylinder 1 contains a gas for instance.

The wall 8 of the cylinder 1 bears internally a shaft 9 having the same axis $x$—$y$ and on this shaft 9 a sleeve 10 is rotatably mounted. The sleeve 10 has an arm 11 terminated with a weight 12. A ratchet wheel 13 secured to the sleeve 10 cooperates with a pawl 14 mounted on the wall 8. At its other end, the sleeve 10 comprises a nut 15 distant from the shaft 9. A screw 16 cooperates with the nut 15, which screw has a cylindrical part 17 rotating in a tubular part 18 secured to the movable wall 6 of the bellows 5. The screw 16 has preferably a long thread and a ratchet wheel 19 may be secured to said screw, to cooperate with a pawl 20 mounted on the wall 6.

The transmission of the movement of the cylindrical body 1 to the clock mechanism (not shown), may be effected through a pulley 21 pinned to the shaft of said body.

The device works as follows: It is submitted that, for a temperature $t_0$, the bellows 5 is in equilibrium under the pressure exerted by the two fluids contained in the two receptacles 1 and 5. The gas is disposed in the one receptacle and the saturated vapor in the other, these two fluids being permanently separated and sealed apart, their different behavior at various temperatures producing the useful effects sought. In view of the different properties of the gas and of the saturated vapor, this equilibrium is generally disturbed for a temperature $t_1$, different from $t_0$. The free wall 6 of the bellows 5 is thus displaced in the direction of the axis $x$—$y$ until the equilibrium is re-established. The difference $t_1$—$t_0$ may result merely from the natural variations of temperature of the surrounding air. When the temperature again changes from $t_1$ to $t_0$, the bellows 5 takes its initial position.

The displacement of the free wall 6 of the bellows 5 produces a given mechanical energy which must be transmitted to the outside, if this energy is to be used. Such a transmission, however, cannot be practically obtained by means of levers, shafts, or the like, since going through the wall of the receptacle 1, these means would affect the tightness thereof.

The transmission takes place by means of the parts above described, in the following way: Owing to the cooperation of the pawl 20 with the ratchet wheel 19, the latter can rotate together with the screw 16, but in one direction only with relation to the bellows 5. On the other hand, the sleeve 10—and therefore the weight 12—can rotate in one direction only with regard to the outer receptacle 1, this owing to the ratchet wheel 13 and the pawl 14. The ratchet wheel 13 and the pawl 14 are so arranged that the weight 12 rotates in the direction reverse from that of the screw 16. The axial displacement of the free wall 6 of the bellows also causes that of the screw 16 which, through the nut 15, causes the arm 11 to be rotated. The linear movement of the bellows 5 is thus transformed into a rotary movement of the weight.

The axis $x$—$y$ being horizontal, the weight 12 (weighing P and distant from the axis $x$—$y$ of a length $d$) produces, during its ascendant movement, a couple $P \cdot d$ the reaction of which is collected, as a driving force, outside the container 1, by means of the pulley 21 or a gear secured to the shaft of said container. If the couple required is lower than $P \cdot d$, the container 1 is stationary and the weight 12 continues its rotating movement.

In order to increase or to replace the action of the gravitation, the weight 12 may be made of a ferro-magnetic material and one of the poles of a magnet 34 may be located in its vicinity, outside the receptacle 1. In this case, the latter is made of a non-magnetic material and the axis $x$—$y$ is not necessarily horizontal.

In the example illustrated, the rotating movement of the weight 12 takes place only in one direction of displacement of the bellows 5, this owing to the presence of ratchets 13, 19 and the pawls 14, 20. In the other direction, the weight bears on the pawls and is stationary.

Without departing from the object of the invention, the ratchets and pawls may be omitted, the screw 16 being for instance secured to the bellows 5. The rotary movement of the weight 12 changes, in this case, in the same sense and simultaneously with the bellows, thus causing a pendular movement of the receptacle 1.

Figure 2:
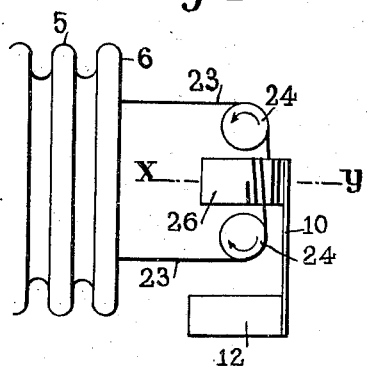
Figs. 2 and 3 show two modifications of the mechanism to transform the reciprocating linear movement of the resilient receptacle into a rotating movement of the eccentric mass.

Still without departing from the scope of the invention, one may apply any mechanical means to transform the linear movement of the resilient receptacle 5 into a rotary movement of the weight 12. In Fig. 2, a device is shown in which this transformation is obtained by means of two wires 23 secured to the wall of the bellows 5 and—through the pulleys 24—wound on a drum 26, one clockwise and the other counterclockwise. The linear displacement of the bellows 5 is thus also transformed into a rotary movement of the drum 26, around its axis $x$—$y$ and therefore that of the weight 12.

Figure 3:
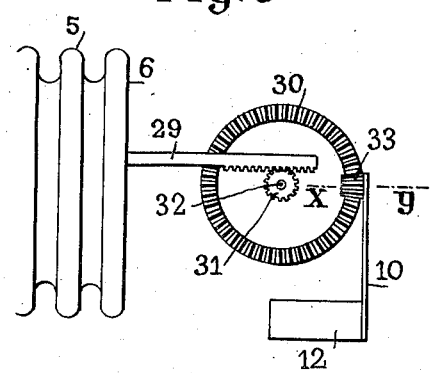

According to a further modification (Fig. 3), a rack 29 is secured to the wall 6, which rack cooperates with a pinion 31 pivoting on a shaft 32. The pinion 31 is rigidly connected to a toothed wheel 30 in mesh with a pinion 33 to which the arm 11 for the weight 12 is secured. The remaining parts of the motor are the same as in Fig. 1.

It is to be observed that according to the invention, the walls of the bellows 5 only support the differences of the pressures exerted by the two fluids and that the outer container 1 supports the difference of pressure with the atmosphere. It is thus possible, without damaging the bellows, to use fluids under very high pressure (for instance the saturated vapor of ammonia, of nitrogen protoxide, of carbonic acid, etc.) and to obtain great variations of pressure with the variations of temperature.

It will be assumed for instance, that the bellows 7 is filled up, under pressure, with steam saturated with carbon dioxide, whilst the reservoir is filled up with air under pressure. It will also be assumed that at a temperature of 15° C., the pressure in the bellows 7 and in the reservoir 1 is of 5 atmospheres.

If the external temperature increases from 15° to 16°, the pressure of the air contained in the reservoir 1 increases, as is well known to the extent of 1/273, that is to say, of 0.0183 atmosphere. On the other hand, the pressure in the bellows 7 increases from 5 atmospheres to 5.12 atmospheres, that is to say, to the extent of 0.12 atmosphere. It results, therefrom that the wall 6 of the bellows is subjected to a force which, in Fig. 1, tends to displace this wall from the left towards the right; this force is equal to the pressure of 0.12 atmosphere per square centimeter, multiplied by the surface of the wall 6. This surface is chosen sufficiently large in order that the force thus created is always greater than the resistance to be overcome.

Figure 4:
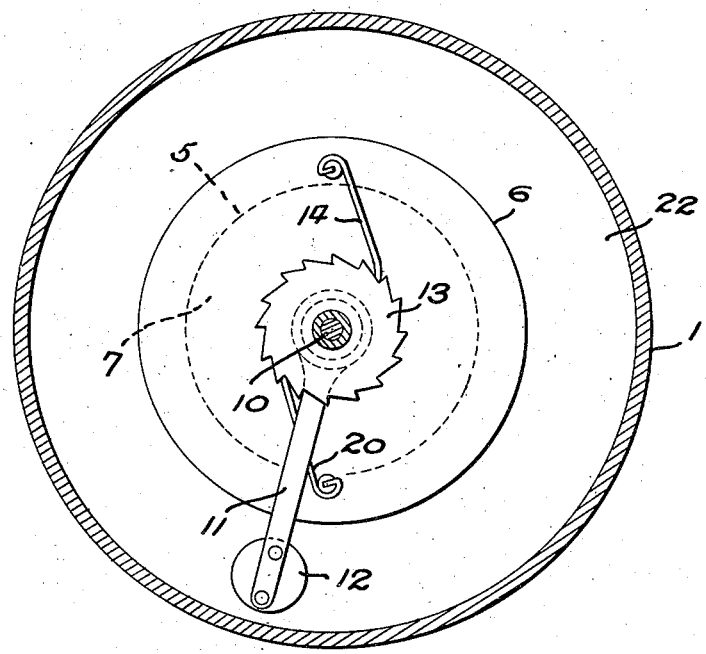
Figs. 4 and 5 are vertical sections of the apparatus of Fig. 1 as taken on lines IV—IV and V—V, the outside casing being omitted altogether in Fig. 5.
Figure 5:
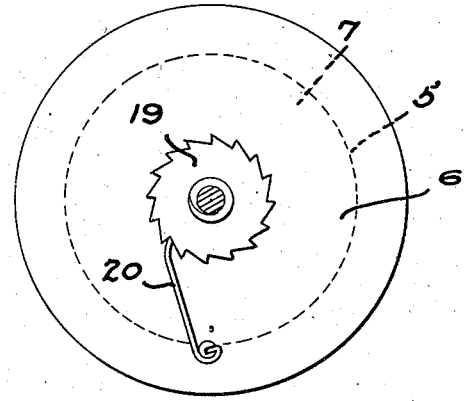

The screw 16 is pushed from the left towards the right; consequently, it tends to enter the nut 15. It results therefrom that this nut tends to rotate, when examining Fig. 4, in a clockwise direction, and that consequently, the screw 16 tends to rotate in a counterclockwise direction (Fig. 5). The rotation of the nut 15 in the clockwise direction is allowed by the ratchet wheel 13 and the pawl 14; the rotation of the screw 16 in the counterclockwise direction is prevented by the ratchet wheel 19 and the pawl 20, assuming of course, that the reservoir 1 is fixed. For the moment it can be admitted that this reservoir is indeed fixed as a resistant torque C' is exerted on the pulley 21 and is opposed to a movement of rotation of the reservoir 1.

Consequently, the nut 15 rotated, and the arm 11 with the counterweight 12 leaves the vertical position and takes a position progressively more oblique.

The conditions of equilibrium of reservoir 1 will now be examined, by considering, therefore, the external forces only, the internal forces (due to the differences of pressure between the interior of the bellows 7 and the interior of reservoir 1) do not intervene in this equilibrium.

The reservoir 1 is subjected to a resistant torque C and, on the other hand, to a driving torque $C_1$, which is due to the weight of the counterweight 12, which gradually leaves the vertical plane passing through the geometrical axis of oscillation of reservoir 1. At the beginning of the movement of the counterweight 12, $C_1$ is smaller than C and the reservoir 1 does not move. But after a certain time, $C_1$ becomes equal to C. Consequently, from this moment, the counterweight 12 no longer moves, and, on the contrary it is the reservoir 1 which begins to rotate, driving the pulley 21, in a counterclockwise direction. This movement continues until equilibrium of the pressures is reestablished.

If, now, the external temperature falls from 16° to 15°, it is obvious that the wall 6 received a reverse movement, that is to say, from right to left, that the wheel 13 tends to rotate in a counterclockwise direction (Fig. 4) and that the wheel 19 (Figure 5) tends to rotate in a clockwise direction.

The movement of wheel 19 is freely allowed by the pawl 20, so that the internal force due to the difference of the pressures, has no driving effect. The equilibrium of the pressures is therefore reestablished very quickly and the apparatus is ready to operate, as described, as soon as the temperature again increases.

The arrangement used in Fig. 1 has been devised for imparting to the pulley 21 a discontinuous movement but always in the same direction. In many cases, it is not necessary that this pulley should have a movement always in the same direction. In this case, use will be made of the device of Fig. 3, in which the movement selectors constituted by the ratchet wheels and pawls have been eliminated.

Other variations may be resorted to and parts may be used without others within the scope and spirit of the invention.

Having now fully described my invention, I claim:—

1. An apparatus of the character described, comprising a pivotally mounted rigid receptacle containing a fluid, a resilient receptacle secured within the rigid receptacle and containing another fluid permanently separated from the first mentioned fluid, an eccentric mass rotatably mounted within said rigid receptacle, a screw mounted on the resilient receptacle and cooperating with a nut secured to said eccentric mass, and means to transmit the rotation of the rigid receptacle to a mechanism for re-winding clocks or the like.

2. An apparatus of the character described, comprising a pivotally mounted rigid receptacle containing a fluid, a resilient receptacle secured within said rigid receptacle and containing another fluid permanently separated from the first mentioned fluid, an eccentric weight rotatably mounted on a wall of the rigid receptacle, a nut secured to said weight, a screw rotatably mounted on the resilient receptacle and cooperating with said screw, ratchet wheels secured to both the screw and new nut and cooperating with pawls mounted on the walls of the resilient and the rigid receptacles respectively, and means to transmit the rotation of the rigid receptacle to a mechanism for re-winding clocks or like apparatus.

3. An apparatus of the character described, comprising a receptacle containing a fluid, a second receptacle within said first named receptacle containing another fluid permanently separated from the first mentioned fluid, one portion of one receptacle being rigidly connected to a portion of the other receptacle, and operative mechanical means interposed between these two receptacles to transform into useful mechanical energy, the variation in the difference of pressures of the two fluids when the latter are simultaneously subjected to a varying temperature.

4. A thermal motor, comprising a receptacle all the parts of which are subjected to one and the same temperature, which temperature is variable, means for dividing this receptacle into two fluid-tight compartments, said means comprising a movable wall, a compressible fluid for filling up the first compartment, another compressible fluid having different properties for filling up the second compartment, and operative mechanical means interposed between said movable wall and a portion of the rigid receptacle for transmitting to the exterior the movements of the movable wall.

5. A thermal motor comprising two fluid-tight receptacles subjected to one and the same temperature, which temperature is variable, two compressible fluids having different properties for respectively filling up each receptacle, a movable mechanical member, means connecting a portion of one receptacle rigidly with a portion of the other receptacle, and operative mechanical means for simultaneously and differentially transmitting to said movable member the pneumatic pressure of each receptacle.

6. A thermal motor, comprising a first fluid-tight receptacle, a first compressible fluid contained in said first receptacle, said first fluid being chosen among those the pressure of which, for a constant volume, varies in function of the temperature according to a definite law, a second fluid-tight receptacle, a second compressible fluid contained in said second receptacle, said second fluid being chosen among those the pressure of which, for a constant volume, varies in function of the temperature according to a definite law different from the first one, and means for transforming into useful energy the variations in the difference of the pressures in both receptacles, which are simultaneously subjected to the same variable temperature, including a portion upon the second receptacle fixed to a portion of the first receptacle, and operative mechanical means in contact with both receptacles and capable of being actuated by the movements of predetermined portions of one receptacle with respect to the other.

7. An apparatus of the character described, comprising a pivotally mounted rigid receptacle, a fluid having certain properties for filling up the said receptacle, a resilient receptacle secured to and inside the rigid receptacle and subjected to the same temperature, a fluid having different properties and permanently separated from the first fluid filling the said receptacle, and means associated with both of said receptacles within the outer receptacle and actuated by said resilient receptacle serving to transmit outside the apparatus the relative displacements of said receptacles, displacements produced by the variation in the difference of the pressure of said fluids when the surrounding temperature varies, and to transform said displacements into useful mechanical energy.

8. An apparatus of the kind described, comprising a pivotally mounted rigid receptacle, a fluid for filling up the said receptacle, a deformable receptacle within said rigid receptacle and subjected to the same temperature, a different fluid for filling up said distortable receptacle permanently separated from the first mentioned fluid, means operatively connecting said receptacles to transmit outside the relative movements of said receptacles, the displacements produced by the variation in the difference of the pressure of said fluids when the surrounding temperature varies, and to transform said displacements into useful mechanical energy.

9. An apparatus of the character described, comprising a pivotally mounted rigid receptacle, a fluid for filling up said receptacle, a deformable receptacle secured within said rigid receptacle and subjected to the same temperature, a different fluid for filling up said distortable receptacle permanently separated from the first mentioned fluid, an eccentrically disposed mass operatively connecting said receptacles to transmit outside the relative displacements of said receptacles, displacements produced by the variation in the difference of the pressure of said fluids when the surrounding temperature varies, and to transform said displacements into useful mechanical energy.

10. An apparatus of the character described, comprising a pivotally mounted rigid receptacle, a fluid for filling up said receptacle, a resilient receptacle secured within said rigid receptacle and subjected to the same temperature, a different fluid for filling up said resilient receptacle permanently separated from the first mentioned fluid, an eccentrically disposed mass rotatably mounted within the rigid receptacle and operatively connected to the resilient receptacle, to transmit to the outside of the apparatus the relative displacements of said receptacles, displacements produced by the variation in the difference of the pressure of said fluids when the surrounding temperature varies, and to transform said displacements into useful mechanical energy.

11. An apparatus of the character described, comprising a pivotally mounted rigid receptacle, a gas for filling up said receptacle, a resilient receptacle within said rigid receptacle subjected to the same temperature, a saturated vapor for filling up said resilient receptacle permanently separated from said gas, an eccentric mass rotatably mounted within the rigid receptacle and operatively connected to the resilient receptacle, to transmit to the outside of the apparatus the relative displacements of said receptacles, displacements produced by the variation in the difference of the pressure of the separated gas and saturated vapor when the surrounding temperature varies, and to transform said displacements into useful mechanical energy.

12. An apparatus of the character described, comprising a pivotally mounted rigid receptacle, a gas above its critical temperature for filling up said receptacle, a resilient receptacle within the rigid receptacle subjected to the same temperature, a saturated vapor for filling up said resilient receptacle permanently separated from said gas, an eccentric mass rotatably mounted within the rigid receptacle and operatively connected to the resilient receptacle, to transmit to the outside of the apparatus the relative displacements of said receptacles, the displacements produced by the variation in the difference of the pressure of said separated gas and saturated vapor, when the surrounding temperature varies, and to transform said displacements into useful mechanical energy.

13. An apparatus of the character described, comprising a pivotally mounted rigid receptacle, a mixture of saturated vapors for filling up said receptacle, a resilient receptacle within the rigid receptacle subjected to the same temperature, another mixture of saturated vapors for filling up said resilient receptacle permanently separated from the first mentioned mixture of vapors, an eccentric mass rotatably mounted within the rigid receptacle and operatively connected to the resilient receptacle, to transmit to the outside of the apparatus the relative displacements of said receptacles, the displacements produced by the variation in the difference of the pressure of said separated mixtures when the surrounding temperature varies and to transform said displacements into useful mechanical energy.

14. An apparatus of the character described, comprising a pivotally mounted rigid receptacle, a fluid for filling up said receptacle, a resilient receptacle within the rigid receptacle subjected to the same temperature, another fluid for filling up said resilient receptacle permanently separated from the first mentioned fluid, an eccentric mass rotatably mounted within the rigid receptacle, means connecting said mass and said resilient receptacle to transform the relative displacements of the receptacles into a rotating movement of said mass thereby causing the rotation of the rigid receptacle, and means to transmit said rotation to a mechanism for re-winding a clock or like mechanism.

JEAN LÉON REUTTER.